May 7, 1940.  F. E. DE G. MOREIRA  2,199,807
GLASS TUBE CUTTER
Filed Oct. 28, 1938
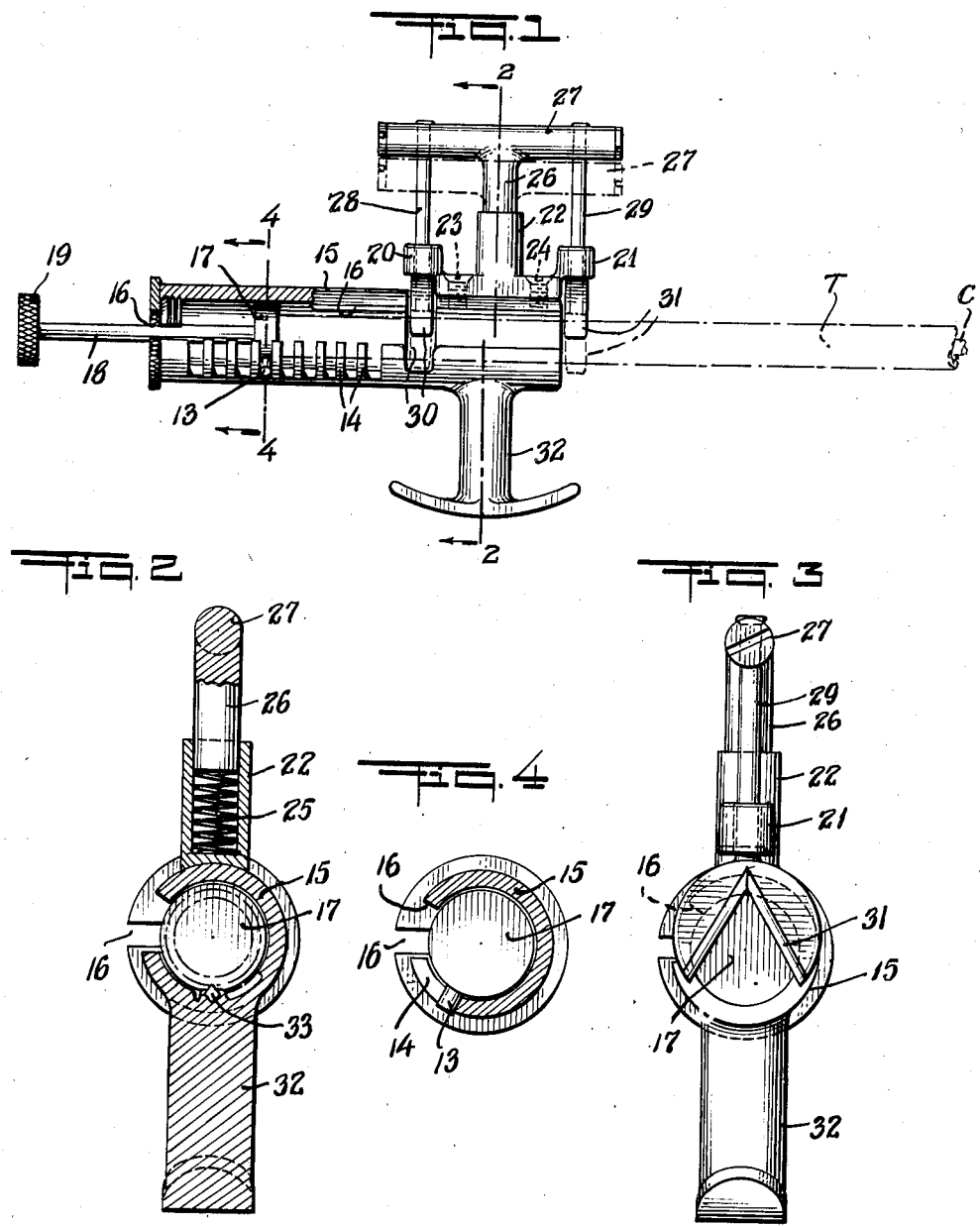

Patented May 7, 1940

2,199,807

UNITED STATES PATENT OFFICE 2,199,807

GLASS TUBE CUTTER

Francisco Elias de Godoy Moreira, S. Paulo, Brazil

Application October 28, 1938, Serial No. 237,441

4 Claims. (Cl. 49—52)

My invention relates to glass cutters and more particularly to a device for cutting glass tubes or vials in order to gain access to their contents.

Cat-gut, used in surgical operations, is packed in glass tubes of varying lengths and diameters and it is the practice in operating rooms to sterilize an ordinary file, and file the tube at one point along the body thereof in a direction perpendicular to its longitudinal axis. The glass tube is then broken by the fingers and the cat-gut extracted.

This practice has proven very unsatisfactory and it is not unusual nor surprising that fingers have been cut and that the glass filings have been a source of danger.

Bearing the foregoing in mind, it is the object of the present invention to provide a simple device to effect the above purpose which shall obviate the necessity of filing the tube and which shall eliminate the dangers attendant with flying particles of glass.

Another object of my invention is to provide such a device which can be easily adjusted to suit the length and width of a glass tube to be cut and which can be subjected to sterilization as a device of this nature must be.

Other objects of my invention will be obvious from the following description it being understood that the above general statements of the objects of my invention are intended to explain and not to limit it in any manner.

Fig. 1 is a front view of the device illustrating the action on a glass tube in broken lines.

Fig. 2 is a section on the line 2—2 of Fig. 1.

Fig. 3 is an end view.

Fig. 4 is a section on the line 4—4 of Fig. 1.

Referring to the drawing, 15 represents a casing having an opening 16 at one end thereof, by means of which opening a plunger 17, having a plunger rod 18 and a button 19, is reciprocated through said casing 15. Formed on the plunger 17 is a lug 13 which is adapted to be received in the recesses between the teeth 14 which are integral with the casing 15.

The opposite end of the casing 15 supports a pair of ears 20 and 21 as well as a hollow chamber 22. The ears 20 and 21, and hollow chamber 22 may be secured to the casing 15 by bolts 23 and 24.

Disposed within the chamber 22 is a coil spring 25 and supported by this spring is the post 26 of hand-hold bar 27.

Integral with or riveted to the hand-hold bar 27 are pins 28 and 29 which reciprocate in bores of ears 20 and 21 and bear on their ends the grippers 30 and 31.

Diametrically opposite the hand-hold bar 27 is disposed the hand-hold member 32. Retained within said casing 15 adjacent the hand-hold member is a diamond 33 which in any well known manner may be set so as to be secure against displacement.

My invention is practiced in the following manner:

The glass tube T, containing the cat-gut C is introduced through the open end of the casing 15, the device having been first sterilized in an ordinary sterilizer used in operating rooms. Different sizes of tubes can be accommodated by actuating the plunger 15 and causing the lug 13 to drop between any two adjacent teeth depending on the size of the tube to be cut. The tube T is held against the outer periphery of the plunger 17 and the hand-hold bar 27 is depressed against the action of the spring 25 until the tube is gripped between the grippers 30 and 31, and the diamond 33. A twist of the free end of the tube in a direction perpendicular to its longitudinal axis is then sufficient to cause the diamond 33 to cut the tube. The tube can then be manually broken open.

I have shown a preferred embodiment of my invention but it is obvious that numerous changes and omissions may be made without departing from its spirit. For example, while I have illustrated my invention using a diamond to cut the glass, it is obvious that an ordinary hardened steel glass cutter may be substituted therefor.

I claim:

1. A device of the character described comprising a hollow casing having an open end for the introduction of a glass tube therein, a plunger slidable in said casing so as to vary the distance between the open end of said casing and said plunger, means to restrain said plunger from slidable movement in a predetermined position, a glass cutter mounted on the floor of said casing between the open end thereof and said plunger and adjustable gripping means for pressing the glass tube against said glass cutter.

2. A device according to claim 1 wherein said restraining means comprises a lug formed on said plunger adapted to be received between any two adjacent teeth formed on the wall of said casing thereby limiting the movement of said plunger.

3. A device of the character described comprising a hollow casing having an open end for the introduction of a glass tube therein, a hand-hold member connected to said casing, spring means urging said hand-hold member outwardly, a glass cutter mounted on the floor of said casing and grippers connected to said hand-hold member for pressing the glass tube against said glass cutter when said hand-hold member is manually depressed against the action of said spring means.

4. A device of the character described comprising a hollow casing having an open end for the introduction of a glass tube therein, a hand-hold member movably connected to said casing, a spring urging said hand-hold member to an inoperative position, gripping means integral with said hand-hold member and glass-cutting means so disposed that the manual depression of said hand-hold member against the action of said spring means causes said glass tube to be pressed against said glass cutter by said gripping means.

FRANCISCO ELIAS DE GODOY MOREIRA.